United States Patent
Hong et al.

(10) Patent No.: US 11,405,895 B2
(45) Date of Patent: Aug. 2, 2022

(54) METHOD AND APPARATUS FOR CONFIGURING FEEDBACK SIGNAL FOR SIDELINK COMMUNICATION IN WIRELESS COMMUNICATION SYSTEM

(71) Applicant: LG ELECTRONICS INC., Seoul (KR)

(72) Inventors: Uihyun Hong, Seoul (KR); Hanbyul Seo, Seoul (KR); Hyukjin Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 58 days.

(21) Appl. No.: 16/968,831

(22) PCT Filed: Feb. 7, 2019

(86) PCT No.: PCT/KR2019/001514
§ 371 (c)(1),
(2) Date: Aug. 10, 2020

(87) PCT Pub. No.: WO2019/156474
PCT Pub. Date: Aug. 15, 2019

(65) Prior Publication Data
US 2021/0029687 A1    Jan. 28, 2021

Related U.S. Application Data

(60) Provisional application No. 62/629,085, filed on Feb. 11, 2018.

(51) Int. Cl.
*H04W 72/04* (2009.01)
*H04W 56/00* (2009.01)
(Continued)

(52) U.S. Cl.
CPC ....... *H04W 72/0406* (2013.01); *H04L 1/1812* (2013.01); *H04L 27/2601* (2013.01); *H04W 56/0005* (2013.01)

(58) Field of Classification Search
CPC ... H04W 28/04; H04W 72/04; H04W 72/042; H04W 88/08; H04W 72/0406;
(Continued)

(56) References Cited

U.S. PATENT DOCUMENTS

2012/0033587 A1\* 2/2012 Papasakellariou ........................... H04L 27/2636
370/277
2017/0347394 A1\* 11/2017 Yasukawa ............. H04L 1/1864
(Continued)

FOREIGN PATENT DOCUMENTS

EP    3 258 723 A1 \* 12/2017 ............ H04W 28/16
EP    3258723 A1    12/2017
(Continued)

OTHER PUBLICATIONS

3GPP TSG RAN WG2, Meeting #99, Berlin, Germany, Aug. 21-25, 2017, R2-1708511, Title: Consideration on short TTI based PC5 operation, Source: ZTE, Agenda item: 9.10.4. (Year: 2017).\*
(Continued)

*Primary Examiner* — Peter G Solinsky
*Assistant Examiner* — Sanjay K Dewan
(74) *Attorney, Agent, or Firm* — Dentons US LLP

(57) ABSTRACT

A method and an apparatus for sidelink of a wireless communication system are proposed. The present disclosure proposes an example in which a TX UE or a RX UE sets a length of an ACK/NACK signal adaptively. The TX UE may set the length of the ACK/NACK signal based on various elements such as priority, length, and service coverage of sidelink data, and the RX UE may set the length of the ACK/NACK signal based on various elements obtained from a process for receiving the sidelink data.

14 Claims, 16 Drawing Sheets

(51) Int. Cl.
*H04L 1/18* (2006.01)
*H04L 27/26* (2006.01)

(58) Field of Classification Search
CPC ............. H04W 56/0005; H04L 5/0007; H04L 1/1812; H04L 27/2601
USPC ........................................................ 370/329
See application file for complete search history.

(56) References Cited

U.S. PATENT DOCUMENTS

| | | | | |
|---|---|---|---|---|
| 2019/0150224 A1* | 5/2019 | Han | ...................... | H04W 88/10 370/329 |
| 2019/0363843 A1* | 11/2019 | Gordaychik | .......... | H04L 1/1854 |
| 2020/0106567 A1* | 4/2020 | Bharadwaj | ............ | H04L 1/1854 |
| 2020/0145799 A1* | 5/2020 | Baghel | ................. | H04L 1/0026 |
| 2020/0351699 A1* | 11/2020 | Pan | ......................... | H04W 4/40 |
| 2020/0351855 A1* | 11/2020 | Kung | ................ | H04W 56/0045 |
| 2020/0389257 A1* | 12/2020 | Kung | ...................... | H04W 4/40 |
| 2020/0403731 A1* | 12/2020 | Zhang | .................. | H04L 5/0044 |
| 2021/0007081 A1* | 1/2021 | Shin | ...................... | H04L 1/1887 |
| 2021/0099901 A1* | 4/2021 | Huang | .................. | H04W 24/10 |
| 2021/0144736 A1* | 5/2021 | Li | ...................... | H04W 72/1263 |
| 2021/0258764 A1* | 8/2021 | Zhang | .................. | H04W 8/005 |
| 2021/0314962 A1* | 10/2021 | Ashraf | ................ | H04B 17/309 |
| 2021/0336728 A1* | 10/2021 | Selvanesan | ........... | H04L 1/1854 |
| 2021/0345363 A1* | 11/2021 | Zhang | ............... | H04W 28/0268 |

FOREIGN PATENT DOCUMENTS

| | | | | |
|---|---|---|---|---|
| WO | 2017011079 A1 | 1/2017 | | |
| WO | WO 2017011079 A1 * | 1/2017 | ............. | H04W 4/00 |
| WO | 2017168039 A1 | 10/2017 | | |
| WO | WO 2017168039 A1 * | 10/2017 | ............... | H04L 1/18 |

OTHER PUBLICATIONS

"Consideration on short TTI based PC5 operation" ZTE, 3GPP TSG-RAN WG2 Meeting #99, Berlin, Germany, Aug. 21-25, 2017. R2-1708511.

* cited by examiner partial coverage out-of-coverage in coverage

FIG. 13

| Symbol Index | S0 | S1 | S2 | S3 | S4 | S5 | S6 | S7 | S8 | S9 | S10 | S11 | S12 | S13 |
|---|---|---|---|---|---|---|---|---|---|---|---|---|---|---|
| sTTI - 7 OS | sTTI - 0 ||||||| sTTI - 1 |||||||
| sTTI - 3/2 OS | sTTI - 0 ||| sTTI - 1 || sTTI - 2 || sTTI - 3 || sTTI - 4 || sTTI - 5 |||
| sTTI - 2 OS | sTTI - 0 || sTTI - 1 || sTTI - 2 || sTTI - 3 || sTTI - 4 || sTTI - 5 || sTTI - 6 ||

(Legacy TTI = Legacy Slot 0 (S0–S6) + Legacy Slot 1 (S7–S13))

METHOD AND APPARATUS FOR CONFIGURING FEEDBACK SIGNAL FOR SIDELINK COMMUNICATION IN WIRELESS COMMUNICATION SYSTEM

CROSS-REFERENCE TO RELATED APPLICATIONS

This application is the National Stage filing under 35 U.S.C. 371 of International Application No. PCT/KR2019/001514, filed on Feb. 7, 2019, which claims the benefit of U.S. Provisional Application No. 62/629,085 filed on Feb. 11, 2018, the contents of which are all hereby incorporated by reference herein in their entirety.

TECHNICAL FIELD

The present disclosure relates to a wireless communication system supporting sidelink communication and more specifically, a method and an apparatus supporting feedback signals between a transmission apparatus and a reception apparatus supporting sidelink communication.

BACKGROUND ART

Recently, there is a growing interest in a sidelink or device-to-device (D2D) technique for performing direct communication between devices. In particular, the sidelink or D2D is drawing attention as a communication technique for a public safety network.

The public safety network has a higher service requirement (reliability and safety) in comparison with the commercial communication network, and in particular, although cellular communication is performed in an out-of-coverage state or is not available, also demands direct signal transmission/reception between devices, i.e., a sidelink (or D2D) operation.

The sidelink (or D2D) operation may have various advantages in a sense that it is signal transmission/reception between proximate devices. For example, a D2D user equipment (UE) may perform data communication with a high transfer rate and a low delay. Further, the D2D operation may distribute traffic concentrated on a base station and may have a role of extending coverage of the base station if the D2D UE plays a role of a relay.

The aforementioned sidelink (or D2D) communication may be extended to apply to signal transmission/reception between vehicles, and communication related to the vehicle is particularly called vehicle-to-everything (V2X) communication.

In the V2X, the term 'X' may be a pedestrian, a vehicle, or an infrastructure/network, which may be indicated respectively by V2P, V2V, or V2I/N.

V2X communication may be implemented based on a sidelink defined based on Release 14 and/or Release 15 of the 3GPP standard, for example. Since the 3GPP standard is based on cellular communication, V2X communication implemented based on the 3GPP standard is called cellular V2X (C-V2X). Meanwhile, C-V2X may be implemented based on a 3GPP new radio (NR) standard (e.g., 3GPP Release 16 or an evolution thereof) to be described later.

Additionally, V2X communication may also be implemented based on the IEEE 802.11p standard. V2X based on the IEEE 802.11p standard is called dedicated short-range communications (DSRC) V2X or DSRC-based V2X.

DISCLOSURE

Technical Problem

The present disclosure proposes an improved method and apparatus that may be applied to sidelink/D2D/V2X communication. More specifically, the present disclosure proposes a method and an apparatus for optimizing the length of a feedback signal for the design of an effective feedback channel for sidelink.

Technical Solution

One embodiment of the present disclosure proposes a method and an apparatus for sidelink of a wireless communication system. More specifically, a first UE may obtain synchronization for the sidelink. Also, the first UE may configure transmission data to be transmitted to a second UE through the sidelink. Also, based on the transmission data, the first UE may set the length of a feedback signal for the transmission data and transmit control information related to the length of the feedback signal to the second UE, wherein the feedback signal may be an Acknowledgement (ACK) signal and/or a Negative ACK (NACK) signal for the transmission data. Also, the first UE may transmit the transmission data to the second UE through the sidelink.

Advantageous Effects

The present disclosure proposes a method and an apparatus for optimizing the length of a feedback signal by considering various communication environments. Since an apparatus/method according to the present disclosure determines the length of TTI applied for feedback by using information that may be obtained from a transmission apparatus and/or information that may be obtained from a reception apparatus, the present disclosure provides an advantageous effect that the TTI length of the ACK/NACK signal is determined by considering priority and latency of sidelink data and a signal reception condition comprehensively.

DESCRIPTION OF DRAWINGS

FIG. 13 shows a specific example related to TTI unit.

MODE FOR DISCLOSURE

Hereinafter, an example for supporting claimed feature is described. The following example should be construed in such a way as to not limit the claimed feature.

Meanwhile, "/" or a comma used in this document may mean and/or. For example, "A/B" means "A and/or B", and may mean any one of "A only" or "B only" or "A and B." Furthermore, technical characteristics individually described within one drawing may be individually implemented or may be implemented at the same time.

Technical features described below may be used in a communication standard by the 3rd generation partnership project (3GPP) standardization organization or a communication standard by the institute of electrical and electronics engineers (IEEE) standardization organization. For example, the communication standard by the 3GPP standard organization includes long term evolution (LTE) and/or an evolution of an LTE system. The evolution of the LTE system includes LTE-advanced (LTE-A), LTE-A Pro, and/or a5G new radio (NR). The communication standard by the IEEE standard organization includes a wireless local area network (LAN) system such as IEEE 802.11a/b/g/b/ac/ax or the like. The aforementioned system uses various multiple access techniques such as orthogonal frequency division multiple access (OFDMA) and/or single carrier-frequency division multiple access (SC-FDMA) or the like in uplink and/or downlink. For example, only the OFDMA may be used in downlink and only the SC-FDMA may be used in uplink, or the OFDMA and the SC-FDMA may be used together in downlink and/or uplink.

Figure 1:
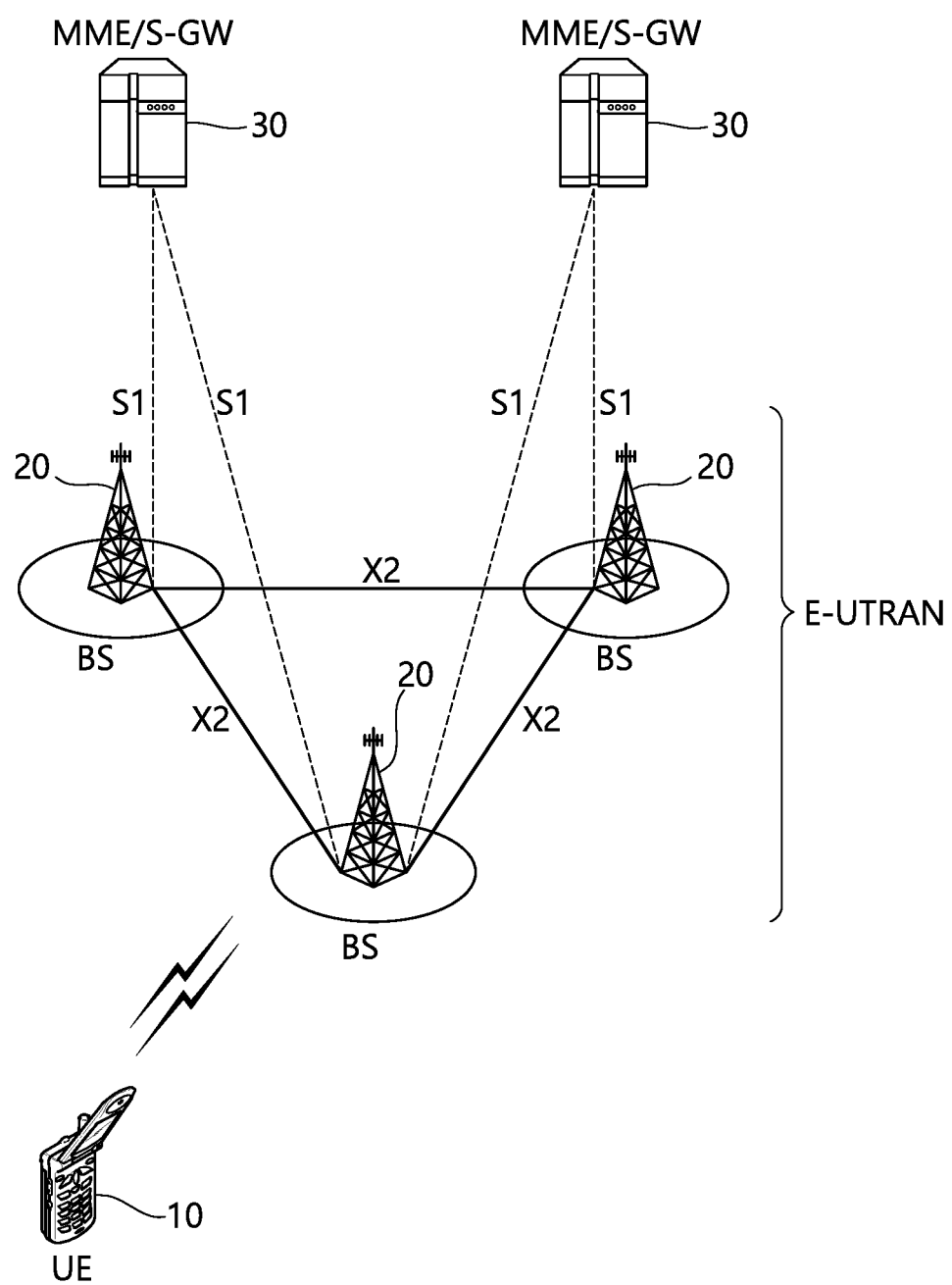
FIG. 1 shows an example of a wireless communication system to which a technical feature of the present disclosure is applicable.

FIG. 1 shows an example of a wireless communication system to which a technical feature of the present specification is applicable. Specifically, FIG. 1 is an example based on an evolved-universal terrestrial radio access network (E-UTRAN). The aforementioned LTE is part of evolved-UMTS (E-UMTS) using the E-UTRAN.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Figure 2:
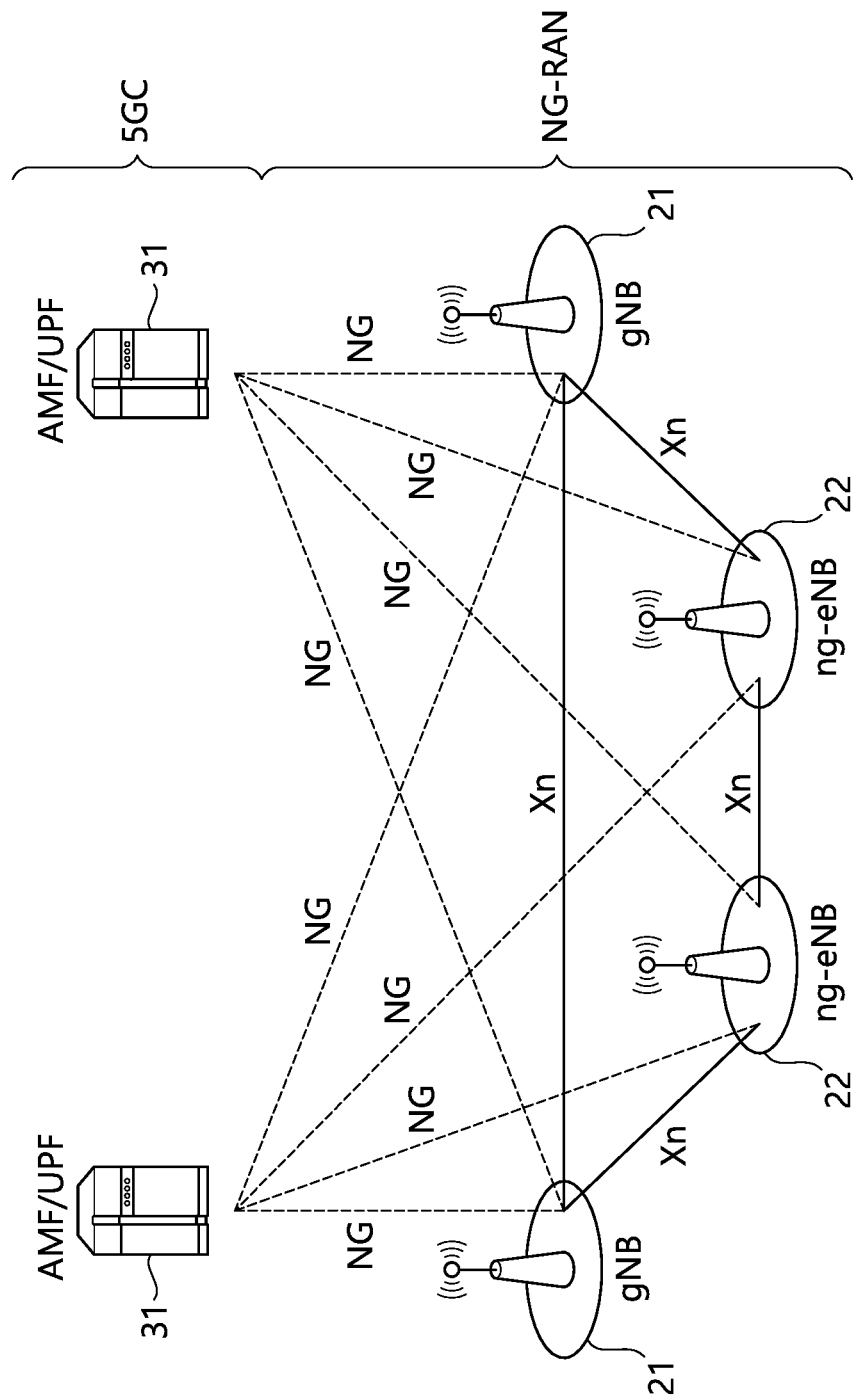
FIG. 2 shows another example of a wireless communication system to which a technical feature of the present disclosure is applicable

FIG. 2 shows another example of a wireless communication system to which a technical feature of the present specification is applicable. Specifically, FIG. 2 is an example in which a 5G new radio (NR) standard is utilized. A communication entity used in the 5G NR standard (hereinafter, "NR" standard) incorporates all or some functions of the entity (eNB, MME, S-GW) introduced in FIG. 1, and may be identified as a name "NG" or "ng" so as to be distinguished from the conventional standard.

The system of FIG. 2 includes a next generation-radio access network (NG-RAN) communicating with a user equipment (UE). NG-RANs 21 and 22 are entities corresponding to a BS, and include a gNB 21 or an ng-eNB 22. A network interface called an Xn interface is defined between the NG-RANs 21 and 22. The gNB 21 provides an NR user plane and control plane for the UE, and is connected to a 5G core network (5GC) via the NG interface of FIG. 2. The Ng-eNB 22 is an entity for providing a user plane and control plane based on evolved-universal terrestrial radio access (UTRA), and is connected to the 5GC via the NG interface.

An access and mobility management function (AMF) is an entity including a function of the conventional MME, and communicates with the NG-RANs 21 and 22 via an NG-C interface. The NG-C interface is a control plane interface between the NG-RAN and the AMF.

A user plane function (UPF) is an entity including a function of the conventional S-GW, and communicates with the NG-RANs 21 and 22 via an NG-U interface. The NG-U interface is a user plane interface between the NG-RAN and the AMF.

On the system of FIG. 1 and/or FIG. 2, layers of a radio interface protocol between the network (NG-RAN and/or E-UTRAN) and the UE can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and a BS.

Hereinafter, a structure of a radio frame transmitted/received through a physical channel will be described.

In the LTE standard (and the evolution of the LTE standard), one radio frame consists of 10 subframes in a time domain, and one subframe consists of 2 slots in the time domain. One subframe may have a length of 1 millisecond (ms), and one slot may have a length of 0.5 ms. A time for transmitting one subframe is defined as a transmission time interval (TTI). The TTI may be a minimum unit of scheduling.

Unlike the LTE standard, the NR standard supports various numerologies, and thus a radio frame is configured in various structures. In the NR standard, a plurality of sub-carrier spacings are supported on a frequency domain. A numerology of the NR is determined by a numerology in use. The plurality of numerologies supported in the NR are shown in Table 1 below. Each numerology is identified by an index "µ".

TABLE 1

| μ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

As shown in Table 1, a subcarrier spacing may be determined as one of 15, 30, 60, 120, and 240 kHz. However, since a specific numeral value is changeable, each spacing (e.g., $\mu=0, 1 \ldots 4$) may be indicated by 1st and 2nd to 5th subcarrier spacings (i.e., N subcarrier spacings).

As shown in Table 1, it may not be used to transmit user data (e.g., physical uplink shared channel (PUSCH), physical downlink shared channel (PDSCH), etc.) based on a subcarrier spacing. That is, user data transmission may not be supported only in predetermined at least one subcarrier spacing (e.g., 240 kHz).

In addition, as shown in Table 1, a synchronization channel (e.g., primary synchronization signal (PSS), secondary synchronization signal (SSS), physical broadcast channel (PBCH), etc.) may not be supported based on the subcarrier spacing. That is, the synchronization channel may not be supported only in specific at least one subcarrier spacing (e.g., 60 kHz).

In the NR standard, the number of slots and the number of symbols to be included may be set differently based on various numerologies, i.e., various subcarrier spacings. A specific example thereof may be as shown in Table 2 below.

TABLE 2

| μ | The number of symbols in slot | The number of slots in radio frame | The number of slots in subframe |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Based on Table 2, when a first numerology with "$\mu=0$" is applied, one radio frame includes 10 subframes, one subframe corresponds to 1 slot, and 1 slot includes 14 symbols. In the present specification, a 'symbol' means a signal transferred for a specific time duration, and for example, may mean a signal generated by orthogonal frequency division multiplexing (OFDM) processing. That is, a symbol of the present specification may mean an OFDM/OFDMA symbol or an SC-FDMA symbol or the like. A cyclic prefix (CP) may be located between the symbols.

An example of Table 2 may be an example to be applied to a normal CP.

Figure 3:
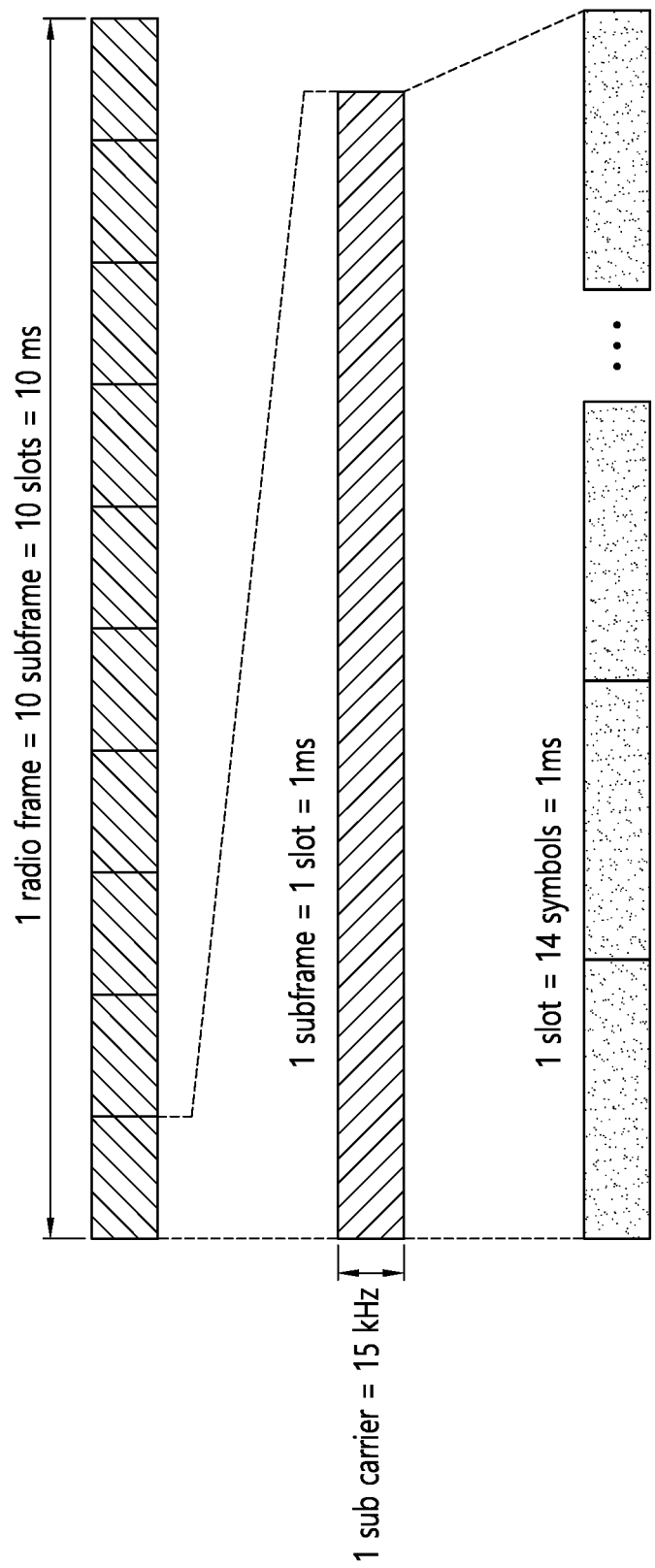
FIG. 3 shows an example to which a specific numerology is applied.

FIG. 3 shows an example to which a specific numerology is applied. That is, FIG. 3 shows a case of $\mu=0$.

Figure 4:
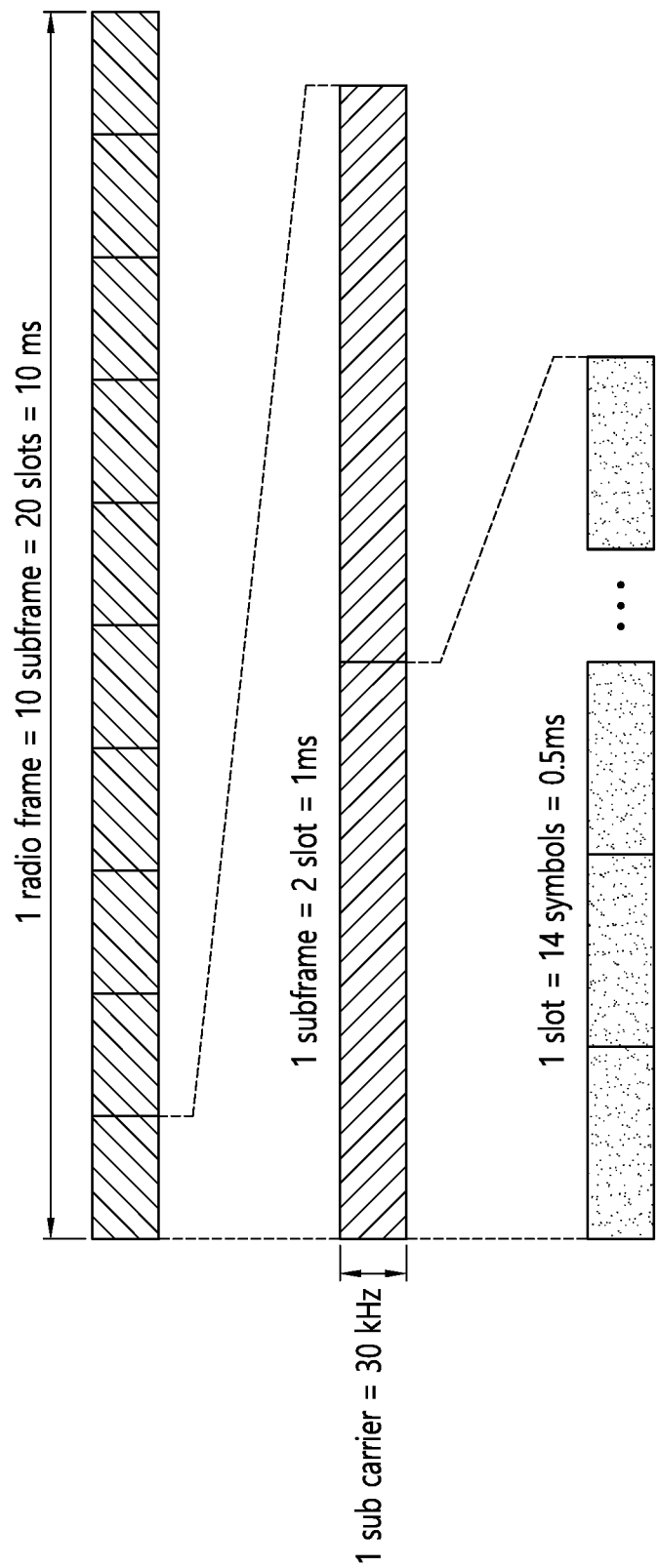
FIG. 4 shows an example to which another numerology is applied.

FIG. 4 shows an example to which another numerology is applied. That is, FIG. 4 shows a case of $\mu=1$.

Meanwhile, frequency division duplex (FDD) and/or time division duplex (TDD) may be applied in a wireless system to which an example of the present specification is applied. When TDD is applied, uplink and downlink subframes are allocated on a subframe basis in an LTE system.

In case of an NR standard/system, each symbol may be divided into downlink (indicated by D), flexible (indicated by X) and uplink (indicated by U). The content of the following table may be applied commonly to a specific cell, or may be applied commonly to adjacent cells, or may be applied individually or differently for each UE.

TABLE 3

| For-mat | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |

For convenience of explanation, Table 3 shows only part of a format (e.g., TDD format) defined in the actual NR standard. A specific allocation scheme may be changed or added.

A UE may have a slot format (i.e., TDD format) configured through a higher layer signal, may have a slot format configured through downlink control information (DCI) transmitted through a physical downlink control channel (PDCCH), or may have a slot format configured through a combination of a higher layer signal (RRC signal) and DCI.

Figure 5:
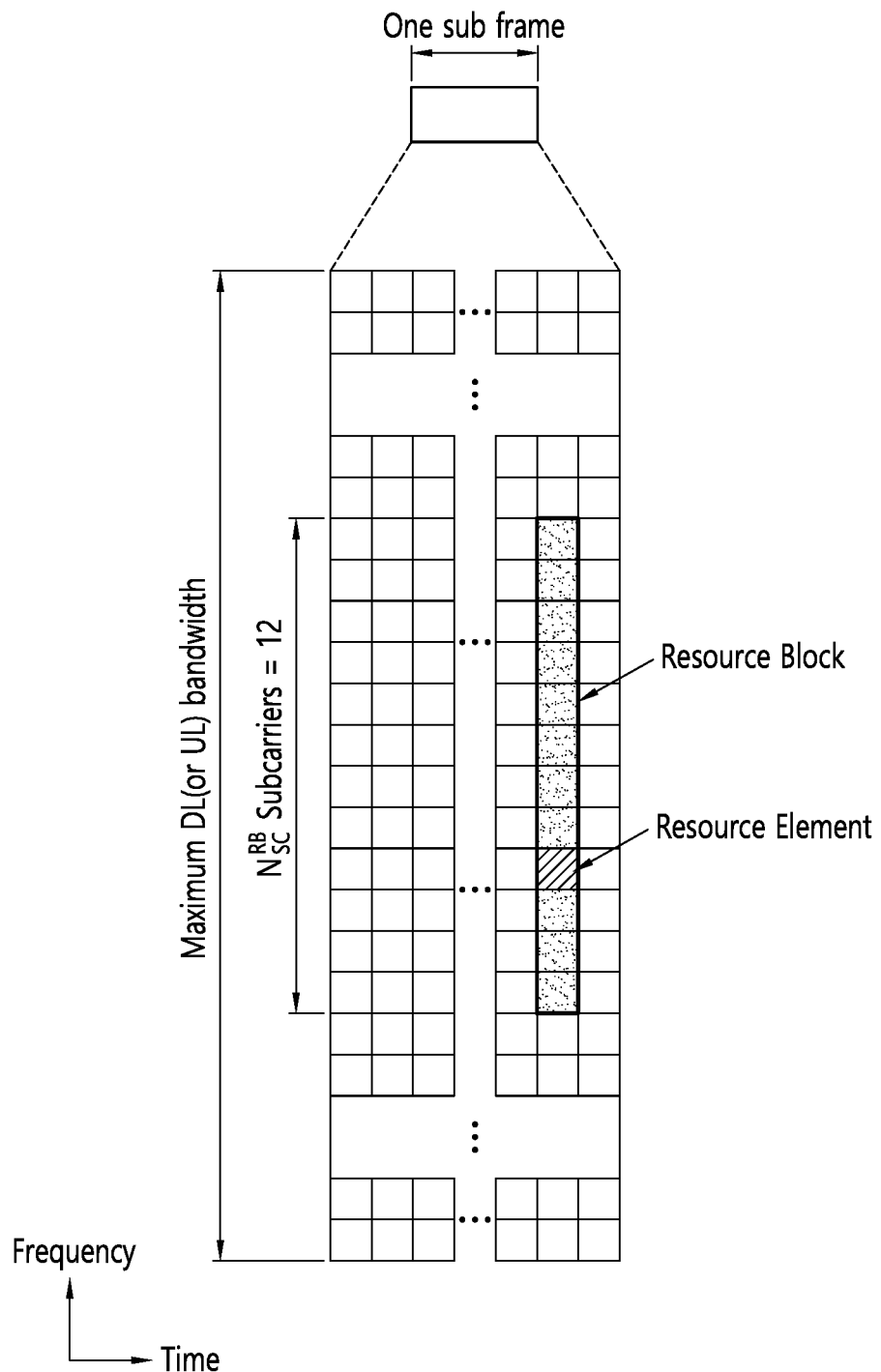
FIG. 5 is a drawing showing an example of a resource grid.

FIG. 5 is a drawing showing an example of a resource grid. The example of FIG. 5 is a time-frequency resource grid used in the NR standard. The example of FIG. 5 may be applied to uplink and/or downlink. As illustrated, a plurality of slots are included on a time axis in one subframe. Specifically, when expressed based on a value "$\mu$", "$14 \times 2\mu$" symbols may be expressed in a resource grid. In addition, as illustrated, one resource block (RB) may occupy 12 contiguous subcarriers. One RB may be called a physical RB (PRB), and 12 resource elements (REs) may be included in each PRB. The number of RBs that can be allocated may be determined based on a minimum value and a maximum value. In addition, the number of RBs that can be allocated may be individually set based on a numerology "$\mu$", and may be set to the same value or different values for uplink and downlink.

Hereinafter, a cell search scheme performed in the NR standard will be described. A UE may obtain a time and/or frequency synchronization with a cell, and may perform cell discovery to obtain a cell identifier (ID). A synchronization channel such as a primary synchronization signal (PSS), a secondary synchronization signal (SSS), a physical broadcast channel (PBCH), or the like may be used for the cell discovery.

Figure 6:
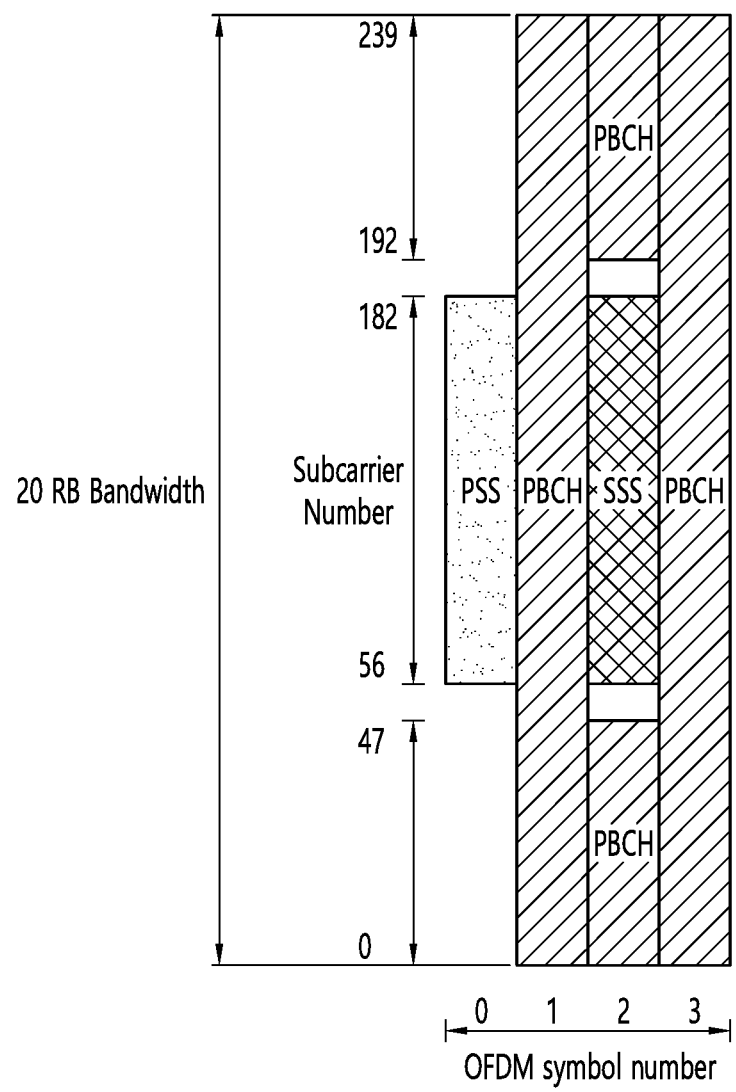
FIG. 6 shows an example of a synchronization channel applied to an embodiment of the present disclosure.

FIG. 6 shows an example of a synchronization channel applied to an embodiment of the present specification. As illustrated, a PSS and an SSS may include one symbol and 127 subcarriers, and a PBCH may be transmitted through 3 symbols and may include 240 subcarriers.

The PSS is used to obtain synchronization signal/PBCH block (SSB) symbol timing, and indicates three hypotheses for identifying a cell ID. The SSS is used to identify the cell ID, and indicates 336 hypotheses. As a result, 1008 physical cell IDs may be configured through the PSS and the SSS.

The SSB block may be transmitted repeatedly based on a predetermined pattern within a 5 ms window. For example, when L SSB blocks are transmitted, all of SSB #1 to SSB #L include the same information, but may be transmitted through beams of different directions. That is, a quasi co-location (QCL) may not be applied for the SSB blocks within the 5 m window. A beam used to receive the SSB block may be used in a subsequent operation (e.g., a random access operation or the like) between a UE and a network. The SSB block may be repeated with a specific period. A repetition period may be determined individually based on a numerology.

As illustrated, the PBCH has a bandwidth of 20 RBs in 2nd/4th symbols, and has a bandwidth of 8 RBs in a 3rd symbol. A DM-RS for decoding the PBCH is included in the PBCH. A frequency domain is determined in the DMRS based on a cell ID value. Unlike in the LTE standard, since a cell-specific RS (CRS) is not defined in NR, a specific DM-RS is defined for demodulation of the PBCH. A PBCH-DMRS may include information indicating an SSB index.

The PBCH performs various functions, and may perform a function of representatively broadcasting a master information block (MIB). By reference, system information (SI) is divided into minimum SI (MSI) and other SI (OSI). The minimum SI may be divided again into MIB and system information type1 (SIB1), and the remaining minimum SI except for the MIB may be called remaining minimum SI (RMSI).

The MIB includes information required to decode the SIB1. For example, the MIB includes the SIB1 (a message 2/4 used in the random access procedure, a subcarrier spacing applied to other system information (SI)), a frequency offset between the SSB and an RB transmitted later, a bandwidth of PDCCH/SIB, and information for decoding the PDCCH (e.g., information on search-space/CORESET/DM-RS or the like described below). The MIB may be transmitted periodically, and the same information may be transmitted repeatedly for a time duration of 80 ms. The SIB1 is transmitted repeatedly through the PDSCH, and includes control information for initial access of the UE and information for decoding a different SIB.

Hereinafter, a sidelink or D2D operation to which an example of the present specification is applied will be described.

Figure 7:
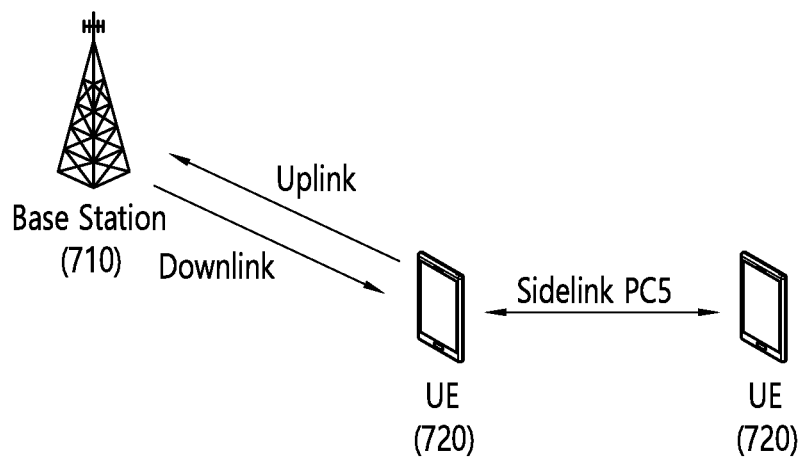
FIG. 7 is a drawing for a structure of sidelink to which an example of the present disclosure is applied.

FIG. 7 is a drawing for a structure of sidelink to which an example of the present specification is applied. As illustrated, uplink (UL) and downlink (DL) may be defined between a BS 710 and a UE 720. In addition, sidelink (SL) is defined between the UEs 720. The SL corresponds to a PC5 interface defined on the 3GPP standard. For example, a resource allocated to the SL may be selected from UL resources. Specifically, a subframe (or a time resource such as a slot or the like) on a UL frequency through FDD or a subframe (or a time resource such as a slot or the like) allocated on UL through TDD may be allocated.

The term "ProSe communication" may be used in the same concept as the SL. In general, the ProSe means an end-to-end application. The SL may mean a channel structure. Specifically, a structure for a physical/transport/logical channel or the like used for an air-interface to realize the ProSe application is described in general in the concept as the SL.

Figure 8:
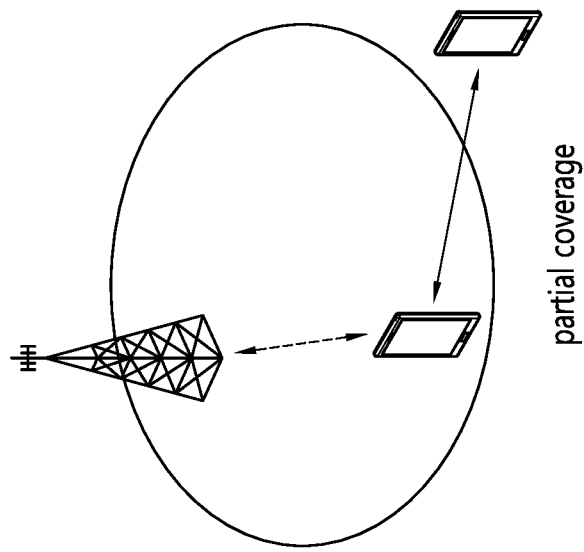
FIG. 8 is a drawing showing an example of a scenario to which sidelink is applied.
Figure 8:
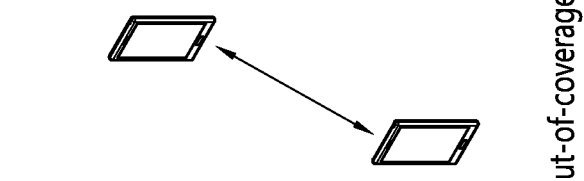
Figure 8:
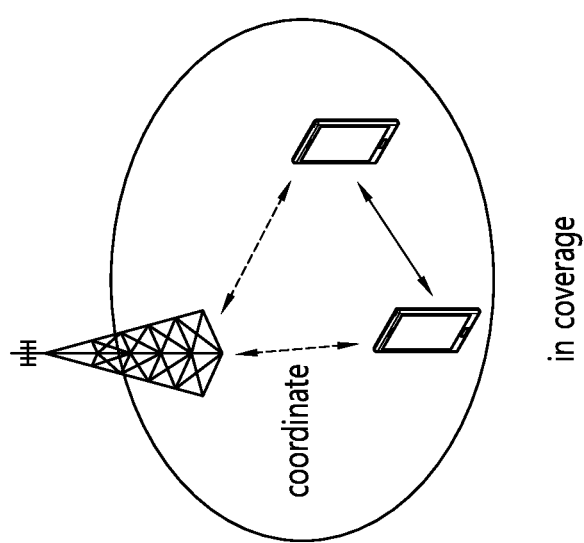

FIG. 8 is a drawing showing an example of a scenario to which sidelink is applied. As illustrated, sidelink (SL) or Prose communication may be divided into three scenarios. First, in an in-coverage scenario, a network (e.g., BS) may allocate a specific resource for sidelink (or ProSe) to a transmitting UE, or may allocate a resource pool (RP) that can be used by the transmitting UE. Second, an out-of-coverage scenario is a case where a network-based control is impossible. The transmitting UE may perform SL communication through a predetermined resource (e.g., a resource predetermined through USIM or UICC card or the like). Even in case of an out-of-coverage scenario, it may be an in-coverage situation for normal cellular traffic, and there may be no coverage only for ProSe communication. Finally, in a partial coverage scenario, an in-coverage UE and an out-of-coverage UE co-exist. Specifically, the out-of-coverage UE may use a predetermined resource, and the in-coverage UE may perform communication through a resource controlled by the network.

Figure 9:
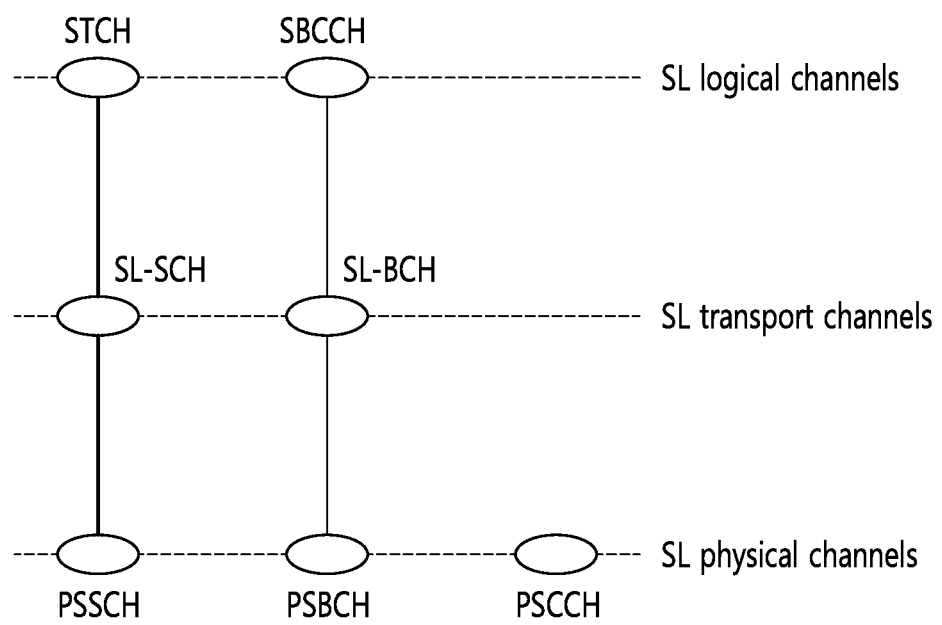
FIG. 9 is a drawing showing a mapping relation between channels related to sidelink.

FIG. 9 is a drawing showing a mapping relation between channels related to sidelink. A logical channel for the sidelink (SL) may be defined as an SL traffic channel (STCH) for a data path and an SL broadcast control channel (SBCCH) for control signaling. The STCH is used to transmit user information for a ProSe application, and is mapped to an SL shared channel (SL-SCH) and a physical DL shared channel (PSSCH). The SBCCH is used to transmit a control signal or the like for synchronization, and is mapped to an SL broadcast channel (SL-BCH) and a physical SL broadcast channel (PSBCH). A physical SL control channel (PSCCH) corresponds to a PDCCH of cellular communication. Specifically, the PSCCH is used to transmit sidelink control information (SCI) which is control information required to receive and demodulate the PSSCH. The SCI information is transmitted before an STCH data block is transmitted.

Figure 10:
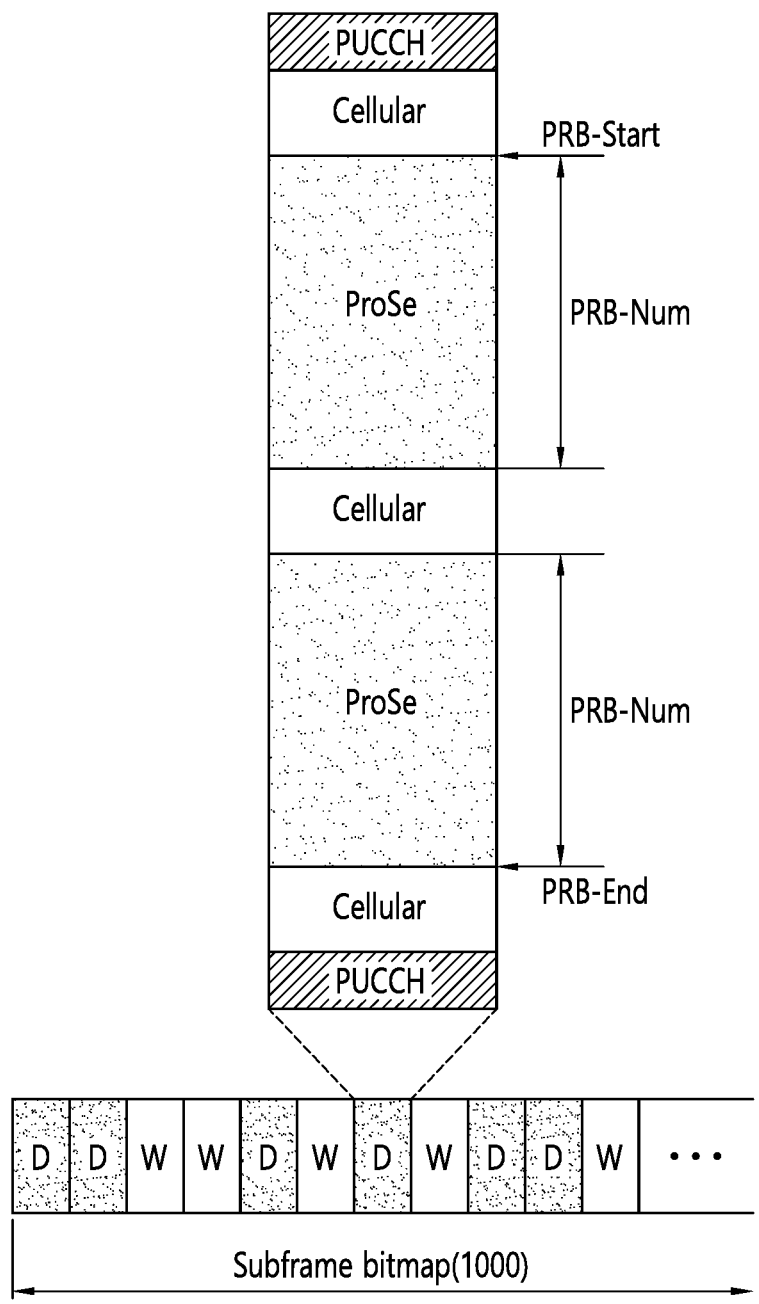
FIG. 10 shows an example of a resource pool for sidelink (SL) communication.

FIG. 10 shows an example of a resource pool for sidelink (SL) communication. The example of FIG. 10 shows an example in which a resource pool is configured on a subframe basis. However, the illustrated subframe may be replaced with another time unit (e.g., slot, symbol, or TTI). Based on the example of FIG. 10, whether a corresponding subframe is used for SL may be indicated depending on a subframe bitmap 1000. A pattern indicated depending on the subframe bitmap 1000 may be repeated.

Based on the example of FIG. 10, two frequency resources may be allocated for SL in one subframe, and each frequency resource may be indicated on a physical resource block (PRB) basis. Specifically, one frequency resource may start from PRB_start, and the other frequency resource may end at PRB_end. The number of PRBs occupied by each of the frequency resources may be PRB-Num. One UE is configured to use any one of a resource for sidelink/ProSe communication and a resource for cellular communication. A resource pool (RP) for SL communication may be divided into RX RP and TX RP. Each RP may be signaled by a BS. All TX RPs may be connected to at least one RX RP.

An RP allocation method may be divided into a mode 1 and a mode 2. In the mode 1, a BS may indicate a resource in a specific RP. In the mode 2, a UE may select a specific RP, and may select a resource from an allocated resource pool set. For the mode 1, the UE shall be in an RRC_connected state. However, the mode 2 may operate in an RRC_idle state or an out-of-coverage state. Details thereof will be described with reference to FIG. 11.

Figure 11:
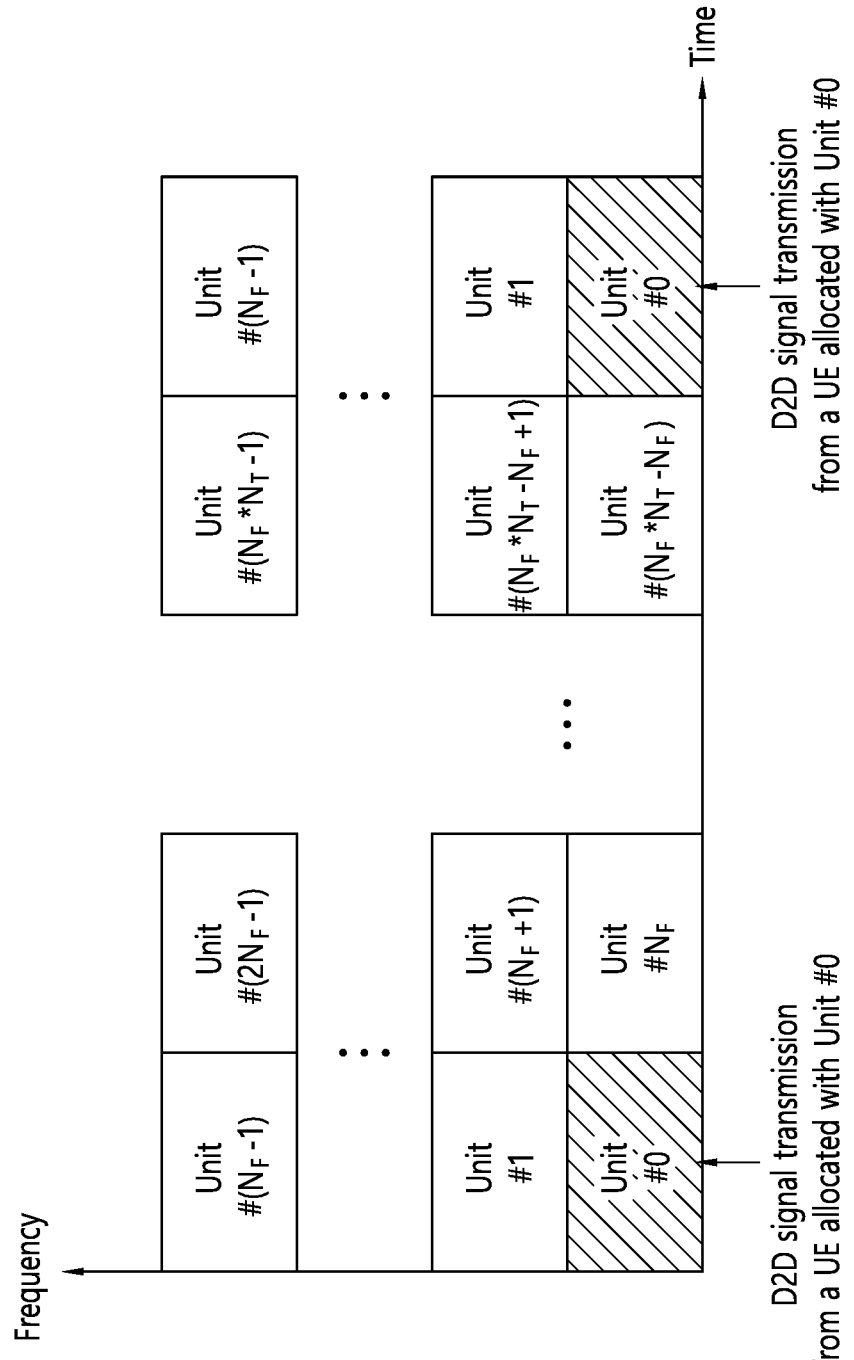
FIG. 11 shows another example of a resource pool for sidelink (SL) communication.

FIG. 11 shows another example of a resource pool for sidelink (SL) communication. The example of FIG. 11 may be used by a UE1 (i.e., transmitting UE) and UE2 (i.e., receiving UE) capable of performing communication through SL. In addition, when a network device such as an eNB transmits and receives a signal based on a communication scheme employed between UEs, the eNB may also be regarded as a kind of UE.

In the following description, the UE1 (transmitting UE) may operate to select a resource unit corresponding to a specific resource within a resource pool (RP) and to transmit a sidelink/D2D signal by using the corresponding resource unit. The UE2 (receiving UE) is configured for an RP to which the UE can transmit a signal, and detects the signal of the UE within the corresponding RP. If the UE1 is located within coverage of an eNB (i.e., in-coverage case), the RP may be informed by the eNB. On the other hand, if the UE is located outside the coverage of the eNB (i.e., a partial coverage or out-of-coverage case), the RP may be informed by another UE or may be determined as a predetermined resource. In general, the RP consists of a plurality of resource units, and each UE may select one or more resource units to transmit its sidelink/2D signal.

FIG. 11 shows an example of a resource unit. Herein, the entire frequency resource is divided into N_F units, and the entire time resource is divided into N_T units, and thus the total number of resource units is N_F*N_T. In other words, it may be assumed that an RP of FIG. 11 is repeated with a period of N_T subframes (or other time units). That is, one resource unit may be repeated periodically as shown in FIG. 11. Alternatively, in order to obtain a diversity effect in the time and/or frequency dimension, an index of a physical resource unit to which one logical resource unit is mapped may vary based on a predetermined pattern as time elapses. In this situation, an RP for sidelink/D2D communication may imply a set of resource units which may be used for transmission by a UE (i.e., transmitting UE) intending to transmit a sidelink/D2D signal.

The aforementioned RP may be subdivided into various types. First, the RP may be classified into various types based on content of a sidelink/D2D signal transmitted in each RP. For example, the content of the D2D signal may be divided as shown below, and a separate RP (i.e., individual or different RP) may be configured for each case.

Content Example #1: Scheduling Assignment (SA) or Sidelink/D2D Control Channel

A control channel described herein is used for a signal including a resource position of a sidelink/D2D data channel transmitted by each transmitting UE in the same or succeeding time unit (e.g., subframe, TTI, slot, symbol) and control information (e.g., at least any one of MCS, MIMO transmission scheme, information element such as timing advance or the like) required to demodulate a corresponding data channel. The aforementioned signal can be transmitted together with the sidelink/D2D data by being multiplexed on the same resource unit. In this case, an SA resource pool means a pool for a resource on which SA is transmitted by being multiplexed with the sidelink/D2D data. An SA control channel may be called a sidelink/D2D control channel or the like. The SA may correspond to the PSCCH described in FIG. 9.

Content Example #2: Sidelink/D2D Data Channel

An individual resource pool (RP) may be allocated for a sidelink/D2D data channel through which a transmitting UE transmits user data by using a resource designated through scheduling assignment (SA). The sidelink/D2D data channel may correspond to the PSSCH described above in FIG. 9. If it can be transmitted together with sidelink/D2D data by being multiplexed on the same resource unit, a resource pool (RP) for the sidelink/D2D data channel may be configured to transmit only the sidelink/D2D data channel configured by excluding SA information. In other words, a resource element used to transmit SA information on an individual resource unit in an SA RP is still used in an RP of the sidelink/D2D data channel to transmit sidelink/D2D data.

Content Example #3: Discovery Channel

A transmitting UE transmits information such as its identity (ID) or the like so that a neighboring UE discovers the transmitting UE. A message used in this case is transmitted through a discovery channel or a physical sidelink discovery channel (PSDCH). An individual resource pool (RP) may be allocated for a corresponding channel.

Even if the aforementioned D2D signal carries the same content, a different resource pool (RP) may be utilized depending on a transmission and reception attributes of the D2D signal. For example, even if the same sidelink/D2D data channel or the same discovery message is transmitted, the RP may be further divided into another different RP depending on a scheme for determining transmission timing of the D2D signal (for example, whether the D2D signal is transmitted at the time of receiving a synchronization reference signal or transmitted after a predetermined timing advance is applied at the time of receiving the synchronization reference signal), a resource allocation scheme (for example, whether a transmission resource of an individual signal is allocated by a BS to each individual transmitting UE or whether an individual transmitting UE selects an individual signal transmission resource by itself within the resource pool), a signal format (for example, the number of symbols occupied by each D2D signal in one subframe or the number of subframes used for transmission of one D2D signal), strength of a signal from the BS, or transmission power intensity of a D2D UE. As described above, a method in which the BS directly indicates a transmission resource of the transmitting UE in sidelink/D2D communication may be called the mode 1, and a method in which a transmission resource region is predetermined or in which the BS designates the transmission resource region and the transmitting UE directly selects a transmission resource may be called the mode 2. In case of D2D discovery, a case where the BS directly indicates a resource may be called a type 2, and a case where the UE directly selects a transmission resource from a predetermined resource region or a resource region indicated by the BS may be called a type 1.

Data Transmission Technique for Sidelink (SL)

In what follows, a method/an apparatus applicable to sidelink communication will be described. However, it should be noted that the technical features described below may also be applied to general-purpose wireless communication apparatus in addition to sidelink communication. In other words, the following technical features may also be applied to communication between stationary nodes such as ordinary IoT devices, relays, or base stations.

Figure 12:
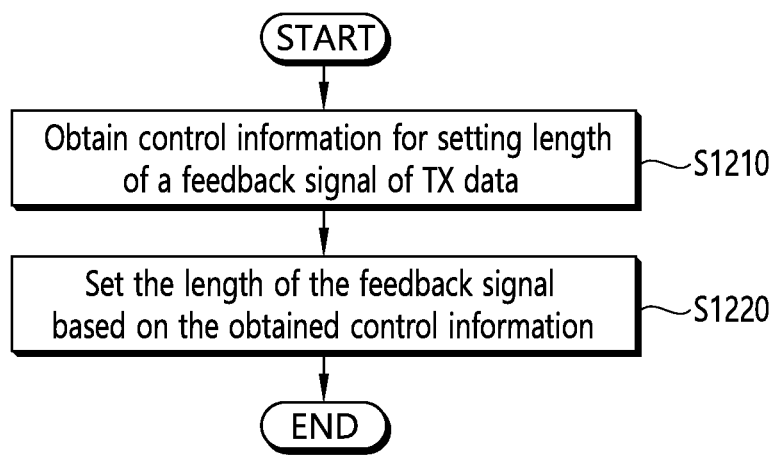
FIG. 12 shows a technique for configuring a feedback signal for sidelink (SL) according to one example of the present disclosure.

FIG. 12 shows a technique for configuring a feedback signal for sidelink (SL) according to one example of the present disclosure. FIG. 12 is related to an example of configuring ACK and/or NACK information (or signal) for data transmitted through a sidelink (for example, the aforementioned PSSCH) from a first UE (for example, a TX UE) to a second UE (for example, an RX UE).

In what follows, for the convenience of description, the data transmitted through the sidelink from the first UE to the second UE is referred to as "TX data". Also, the ACK and/or NACK information/signal for the TX data is referred to as a "feedback signal". The ACK/NACK information/signal may be determined based on the conventional Hybrid Automatic Repeat reQuest (HARQ) technique.

As shown in the figure, in the S1210 step, the first and/or the second UE may obtain control information for setting the length of a feedback signal of TX data. In other words, the first UE (for example, TX UE) may set the length of a feedback signal of the TX data based on various pieces of information related to the TX data (for example, priority of the TX data). Or, the S1220 step may be performed by the second UE (for example, RX UE). For example, the second UE may set the length of a feedback signal based on various pieces of information (for example, RX power) of the TX data.

The length of a feedback signal may be expressed by using various time units. For example, the length may be expressed in terms of the number of OFDM symbols (namely, CP-OFDM symbol, DFT-S-OFDM symbol, or SC-FDMA symbol), the number of slots according to the LTE/NR standard, or Transmission Time Interval (TTI) according to the LTE/NR standard.

Meanwhile, the first and/or second UE may set the length of a feedback signal based on the control information obtained from the S1220 step. For example, the control information may be the priority or RSRP of TX data, a more specific example of which will be described below. Also, the first and/or second UE sets the length of a feedback signal based on the control information obtained through the S1220 step. For example, when the priority of the TX data is high, the first UE may set the length of a feedback signal to be short. Also, when RSRP of the TX data is high, the second UE may set the length of a feedback signal to be short.

The S1210 and S1220 steps will be described in more detail below.

As described above, the length of a feedback signal may be expressed by various time units. In what follows, for the convenience of description, the length of a feedback signal will be expressed in terms of TTI units. In general, the TTI may be determined based on the size of data blocks passed from higher layers to the radio link layer. TTI may include a varying number of OFDM symbols depending on the related communication standards (for example, LTE/NR standards).

FIG. 13 shows a specific example related to TTI unit.

As shown in the figure, TTI used in the present disclosure may be the legacy TTI (or long TTI) compliant with the legacy LTE specification or short TTI (sTTI) configured to be shorter than the legacy TTI. More specifically, TTI may be the legacy long TTI configured to be 1 ms long, where, in this case, the TTI may include 14 OFDM symbols (namely, S0 to S13 symbol). Also, the TTI according to the present disclosure may be configured to have 7 symbols as shown in the figure or configured to have 2 or 3 symbols. The number of TTIs shown in FIG. 13 may be changed.

The length of TTI may be set to be variable. To this end, it is possible to set the length of the TTI dynamically or semi-dynamically. For example, the length of the TTI may be set through Downlink Control Information (DCI) on the physical control channel (PDCCH, ePDCCH, or PSCCH) or set by combining the physical control channel and the RRC signal (or MAC CE).

As described above, the TTI may be used as a transmission unit for TX data and a feedback signal (namely, ACK/NACK). For example, TX data may be transmitted through one of various TTIs shown in FIG. 13. Also, the feedback signal (namely, ACK/NACK signal) for the TX data may also be transmitted through one of the various TTIs shown in FIG. 13. For example, the TX data may be transmitted through the TTI occupying 7 symbols, and the feedback signal for the TX data may be transmitted through the TTI occupying 2 symbols.

Meanwhile, a preconfigured time interval may be set between the TX data and the feedback signal therefor. In other words, after a few symbols (or TTIs) since a TTI for TX data is transmitted, a feedback signal (ACK/NACK) for the TX data may be received. The time interval configured between the TX data and the feedback signal therefor may be determined in various ways. For example, a fixed time interval may be applied, or a varying time interval may be applied based on the information provided in advance through various control channels.

The length of the TX data (namely, the length of the TTI applied to the TX data) may be determined based on various conditions such as the size of the TX data or channel condition. In this case, it is preferable that the length of the feedback signal (namely, ACK/NACK) for the TX data should also be determined based on the various conditions. In what follows, the present disclosure proposes an example of determining the length of the feedback signal (namely, ACK/NACK) for the TX data.

In the legacy LTE standard, frequency/time resources for uplink (UL)/downlink (DL) are determined statically according to the FDD or TDD scheme. However, in a new 5G standard (for example, the aforementioned NR standard), it is possible to configure the frequency/time resources for UL, DL, and sidelink (SL) in a flexible manner for each subframe. Also, the TTI applied to a data signal (for example, a PDSCH or PSSCH signal) may also be designed flexibly according to the legacy requirements. In other words, as shown in FIG. 13, various lengths may be selected for the TTI applied to a data signal.

Also, a feedback channel (for example, HARQ-ACK/NACK) is newly proposed for V2X communication relying on the recent NR specification, where the new proposal also includes an example of selecting resources of the HARQ-ACK/NACK signal dynamically. Also, the length of the TTI applied to the HARQ-ACK/NACK signal may also be selected in a flexible manner.

Although a specific example of a first UE (namely, a TX UE) and/or a second UE (namely, an RX UE) setting the length of the TTI applied to the HARQ-ACK/NACK signal is described separately below, the example may be described briefly as follows. For example, the target coverage of a service related to TX data (for example, the distance up to which the service needs to be supported) may be configured to have various values. If the target coverage of a service related to the TX data is configured to be narrow, the transmission time of the HARQ-ACK/NACK may be set to be short. However, if the target coverage is configured to be broad, a sufficient amount of transmission energy is required for the HARQ-ACK/NACK to be transmitted over a long distance, and accordingly, it is preferable to set the transmission time of the HARQ-ACK/NACK to be relatively long. Accordingly, the length of the TTI used to transmit a feedback signal (namely, HARQ-ACK/NACK) for TX data may be set based on: 1) the service type related to the TX data or 2) control information obtained by the RX UE (for example, Reference Signal Received Power (RSRP) of a received signal). To set the TTI length of a feedback signal, the TX UE may signal 1) the service type of TX data and/or 2) target coverage information to the RX UE through physical layer or higher layer signaling. Or, the TX UE may explicitly signal the TTI length of the feedback signal to the RX UE through physical layer or higher layer signaling. More specifically, the information signaled to the RX UE to set the TTI length of a feedback signal may be included in a control channel (for example, PSCCH) or a MAC Control Element (CE) message.

As described above, the operation for setting the TTI length of a feedback signal (for example, the S1220 step) may be performed by the first UE (namely, TX UE) and/or the second UE (namely, RX UE). It is also possible a network node (for example, BS) configures the TTI length of the feedback signal based on the value signaled by the first UE and/or the second UE. In this case, the network node may signal the information on the type and/or range of TTI length that may be used in a specific resource pool (RP) or a specific carrier (for example, a radio resource including at least one sub-carrier, at least one BWP, or at least one component carrier) to the first/second UE through physical layer (and/or higher layer) signaling.

As described above, the present disclosure proposes an example in which the TTI length of a feedback signal is configured by various types of communication nodes. In what follows, described will be an example where the TTI length of a feedback signal is configured by the first UE (namely, TX UE).

First, the TX UE may set the TTI length of a feedback signal based on the target coverage of TX data. More specifically, the TX UE may set the TTI length of the feedback signal based on the latency requirement and/or ProSe priority per packet (PPPP) of the TX data. If latency required for the TX data is short, or if PPPP of the TX data is high (namely, in the case of high priority), it is desirable to set the TTI length of the feedback signal to be short. This is so because when the TTI occupied by the feedback signal is configured to be short (for example, when the TTI with a short length shown in FIG. 13 is selected), the feedback signal may be transmitted quickly. Or, the TX UE may transmit the information on the PPPP and/or latency requirement to the RX UE through physical channel (PSCCH) and/or higher layer signaling, and the RX UE may set the TTI length of the feedback signal based on the information received from the TX UE. The TTI length configured by the TX UE and/or the RX UE may be selected from available TTI lengths. A set of available TTI lengths may be determined in advance or may be transmitted by a network node (for example, BS) to the TX UE and/or the RX UE through physical layer and/or higher layer signaling.

The information used for setting the TTI length for a feedback signal may be configured in various ways. For example, besides the PPPP or latency requirement of TX data, the TTI length of a feedback signal may be set based on the TTI length used for the TX data. More specifically, if the length of the TTI for the TX data is relatively long, the TX UE (or the RX UE) may also set the TTI length of the feedback signal to be long. Also, the TX UE (or the RX UE) may set the TTI length of the feedback signal by considering the length of the TX data together with the PPPP or the latency requirement. For example, the TX UE (or the RX UE) may assign a first weight to the priority of the TX data and a second weight to the length of the TX data.

Meanwhile, according to the example above, it is possible that a short TTI may be determined as the TTI for feedback information in a situation where the RX UE is already transmitting data through a long TTI. However, when different TTIs are configured simultaneously for the same UE, it may be difficult to multiplex the data transmitted by the RX UE and feedback information. Accordingly, when a UE configured with a TTI for ordinary data transmission transmits a feedback signal, it is possible to configure a TTI for the feedback signal to be the same as the TTI for the ordinary data transmission. Or, it is also possible for the UE transmitting the feedback signal to set the TTI length of the feedback signal based on the TTI length applied to the data received by the UE.

The example above may be described with reference to a drawing as follows.

Figure 14:
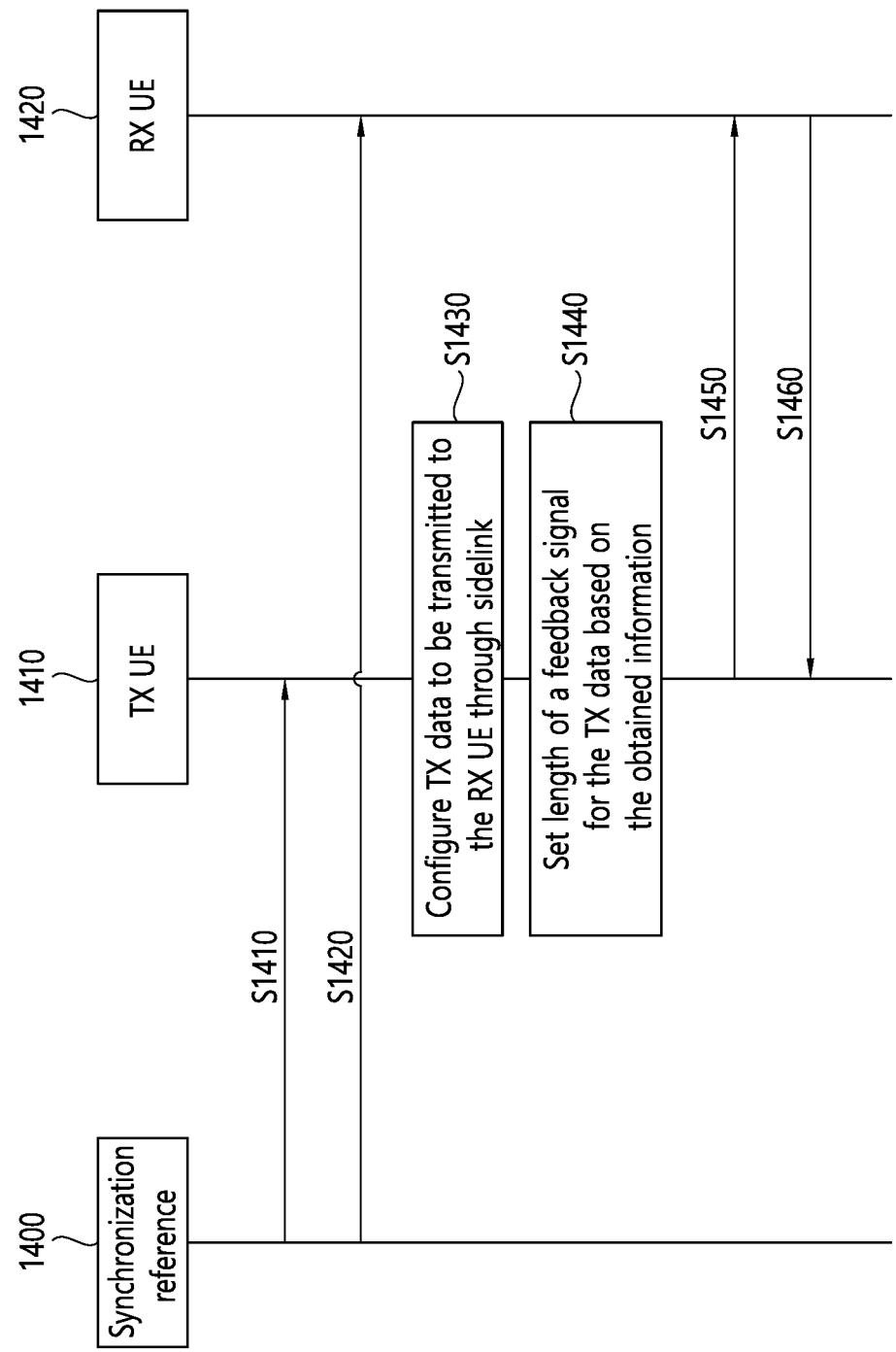
FIG. 14 shows an example in which the length of TTI for feedback information is configured.

FIG. 14 shows an example in which the length of TTI for feedback information is configured.

As described in the figure, the TX UE 1410 may obtain synchronization from a synchronization reference 1400, and the RX UE 1420 may also obtain synchronization from the synchronization reference 1400, S1410, S1420. In other words, the TX UE 1410 may obtain synchronization for sidelink.

Next, the TX UE 1410 may configure TX data to be transmitted to the RX UE 1420 through sidelink S1430. During this process, the TX UE 1410 may obtain information on the target coverage, PPPP, and latency requirement related to the TX data and/or the length of the TTI allocated for the TX data. Based on the obtained information, the TX UE 1410 may set the length of a feedback signal for the TX data S1440. To put it differently, based on the TX data (more specifically, based on the target coverage/PPPP/latency/TTI length for the TX data), the TX UE 1410 may set the length of a feedback signal (namely the TTI length of ACK/NACK) for the TX data. The TX UE 1410 may transmit information on the length of a feedback signal for the TX data (namely, TTI length of ACK/NACK) to the RX UE 1420.

Afterwards, the TX UE 1410 may transmit the TX data to the RX UE 1420 through sidelink S1450. Afterwards, the RX UE 1420 may decode the TX data, generate a feedback signal (namely, ACK/NACK signal) from the decoding result, and transmit the feedback signal to the TX UE 1410 based on the TTI length set by the TX UE 1410, S1460.

According to an example of the present disclosure, it is also possible that the length of a feedback signal (namely, TTI length of ACK/NACK) is set by the RX UE. In what follows, described will be an example in which the RX UE set the length of a feedback signal.

When the RX UE set the length of feedback information (namely, TTI length of ACK/NACK), the RX UE may use the RSRP value measured/obtained from the TX UE. In other words, the RX UE may set the length of the feedback information based on the RSRP value. For example, if the RSRP measured by the RS UE is good enough, it may not be necessary to transmit the HARQ-ACK/NACK for a long period of time. Accordingly, when the RSRP is measured to be higher than a threshold value, the RX UE may set the TTI length of ACK/NACK to be relatively short. More specifically, a combination of lengths of available feedback information may be determined in advance according to the threshold value of the RSRP or for each interval of the RSRP value, or a combination of lengths of available feedback information may be signaled to the TX UE and/or the RX UE by the network node (for example, BS) through physical layer and/or higher layer signaling.

Meanwhile, when the RX UE set the TTI length for ACK/NACK based on the RSRP value, the RX UE may set the TTI length for ACK/NACK by considering channel busy ratio (CBR). CBR is defined in the legacy 3GPP standard, which may be determined based on the ratio of UEs using sidelink resources. For example, when CBR is high, it may be determined that there exist a large number of UEs performing sidelink transmission in the surroundings. To put it differently, when the CBR value is high, it may be assumed that the probability of collision among resources within one subframe becomes high. For example, when CBR is larger than a threshold value, the RX UE may use HARQ-ACK/NACK TTI length A configured according to the RSRP value while, when the CBR is less than a predetermined threshold value, the RX UE may use HARQ ACK/NACK TTI length B configured according to the RSRP value. In other words, even when the same RSRP value is measured, if the CBR is larger than the threshold value, the ACK/NACK TTI length may be determined as A value (or any one of the values among group A) while, if the CBR is less than the threshold value, the ACK/NACK TTI length may be determined as B value (or any one of the values among group B). Also, when the CBR is larger than a predetermined threshold (namely, when there are a larger number of UEs for sidelink transmission in the surroundings), the A value may be set to be shorter while, when the CBR is less than the predetermined threshold (namely, when there are a smaller number of UEs for sidelink transmission in the surroundings), the B value may be set to be longer. This is so configured to cope with the change of a total amount of interference by adjusting the TTI length according to the amount of congestion. Since a plurality of UEs may measure different CBR values and accordingly, use different TTI lengths, which, in this case, may make it difficult to multiplex different signals, change of HARQ-ACK TTI length according to the CBR change may be indicated commonly for UEs by the network. For example, UEs may provide their CBR measurement to a network node (for example, BS) as feedback information, and the corresponding network node may determine the TTI length to be used for the first and/or second UE based on the feedback information on the CBR measurement and signal the determined TTI length.

Additionally or alternatively, the RX UE may set the length of the TTI for feedback information based on the size of the feedback information, namely, based on the number of HARQ-ACK/NACK bits. For example, if the number of HARQ-ACK/NACK bits is smaller than a threshold, the length of the TTI for the feedback information may be set to be short. In this case, the length of HARQ-ACK/NACK TTI configured according to the number of HARQ-ACK/NACK bits may be predetermined or signaled by a network node (for example, BS) through physical layer or higher layer signaling.

As described above, when the RX UE set the length of feedback information (namely, ACK/NACK TTI length), the RX UE may pre-configure a plurality of TTI lengths available for ACK/NACK based on the length of TX data (namely, TTI length of data received from the TX UE). In this case, the RX UE may prepare ACK/NACK messages fitted to the TTI lengths pre-configured to be used at the timings of transmitting and receiving ACK/NACK and transmit the ACK/NACK messages depending on the needs.

Additionally or alternatively, for the purpose of efficient HARQ-ACK/NACK resource allocation among UEs, it may be determined whether a specific UE should transmit or omit the HARQ-ACK/NACK message. As an example, when the specific UE transmits a plurality of HARQ-ACK/NACK messages for the data received from other different UEs, TTIs with different lengths may be configured at the same time. In this case, since resources may collide among the corresponding channels, transmission of the HARQ-ACK/NACK signal related to the data with low priority may be omitted. Or, if the number of transmitted HARQ-ACK/NACK bits is small compared with a threshold value, transmission of a related HARQ-ACK/NACK signal may be omitted. Meanwhile, even though the entire HARQ-ACK/NACK signals may be punctured or omitted due to rate matching, it is still possible to omit only the ACK/NACK symbols overlapping other messages in the time domain through the FUM scheme.

The present disclosure proposes examples in which various nodes (for example, TX UE, RX UE, and BS) determine the length of feedback (for example, TTI length for transmission of HARQ-ACK/NACK) to be variable. For the convenience of description, each example has been described separately, but the examples of the present disclosure may be combined with each other to be used/applied/implemented at the same time. For example, the example where the TX UE determines the feedback length and the example where the RX UE determines the feedback length may be combined together, the TX UE may determine the feedback length by considering various elements (for example, service coverage, length of transmission data, and latency) together, or different nodes may determine the feedback length by considering various elements simultaneously.

Figure 15:
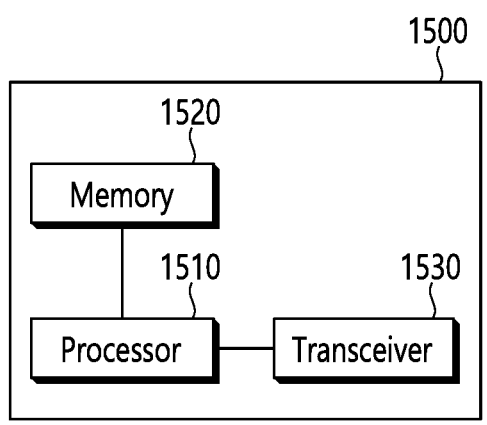
FIG. 15 shows an example of a UE to which one example of the present disclosure is applied.

FIG. 15 shows an example of a UE to which one example of the present disclosure is applied.

Referring to FIG. 15, the UE 1500 comprises a processor 1510, a memory 1520, and a transceiver 1530. The processor, memory, and transceiver shown in the figure may be implemented by the respective chips or at least two or more blocks/functions may be implemented by a single chip.

The transceiver 1530 shown in the figure performs an operation for transmitting and receiving signals. More specifically, the transceiver 1530 may transmit and receive a signal for obtaining synchronization. Also, the transceiver 1530 may receive and decode a radio signal compliant with the IEEE 802.11 specification or 3GPP specification (for example, the LTE/LTE-A/NR specification). Also, the transceiver 1530 may transmit a feedback signal according to TTI units determined by the processor 1510.

The processor 1510 may implement the functions, processes and/or methods proposed by the present disclosure. More specifically, the processor 1510 may set the length of HARQ-ACK/NACK TTI based on the obtained information (for example, PPPP, latency requirement, or RSRP).

The processor 1510 may include application-specific integrated circuit (ASIC), other chipsets, logic circuits, and a data processing device. The memory 1520 may include read only memory (ROM), random access memory (RAM), a flash memory, a memory card, a storage medium and/or other storage device.

Figure 16:
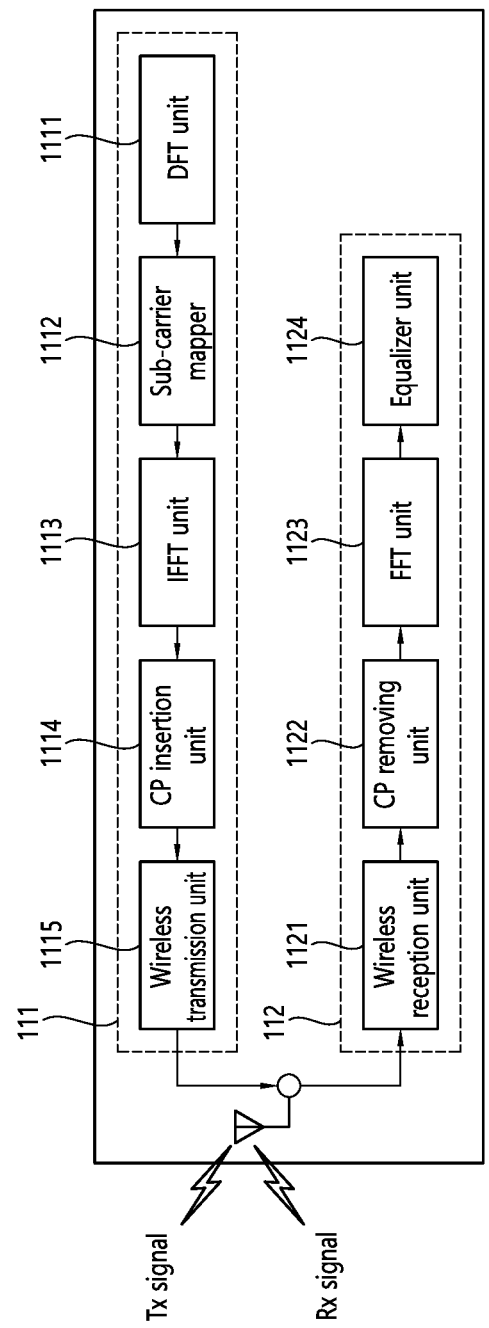
FIG. 16 shows another example of a detailed block diagram of a transceiver.

FIG. 16 shows another example of a detailed block diagram of a transceiver.

Referring to FIG. 16, the transceiver 110 includes a transmission part 111 and a reception part 112. The transmission part 111 includes a Discrete Fourier Transform (DFT) unit 1111, a sub-carrier mapper 1112, an IFFT unit 1113, and a CP insertion unit 1114, and a wireless transmission unit 1115. Also, the transmission part 111 may further include a scramble unit (not shown), a modulation mapper (not shown), a layer mapper (not shown), and a layer permutator (not shown), which may be disposed before the DFT unit 1111. In other words, to prevent the peak-to-average power ratio (PAPR) from increasing, the transmission part 111 makes information processed by the DFT unit 1111 before mapping the signal to a sub-carrier. The sub-carrier mapper 1112 performs sub-carrier mapping on the signal spread (or precoded in the same context) by the DFT unit 1111, after which the mapped signal is again processed by the Inverse Fast Fourier Transform (IFFT) unit 1113 and converted to the signal on the time axis.

The DFT unit 1111 performs DFT on the input symbols and outputs complex-valued symbols. For example, if Ntx symbols are input (where Ntx is a natural number), the DFT size is Ntx. The DFT unit 1111 may be called a transform precoder. The sub-carrier mapper 1112 maps the complex-valued symbols to the respective sub-carriers in the frequency domain. The complex-valued symbols may be mapped to resource elements corresponding to the resource blocks allocated for data transmission. The sub-carrier mapper 1112 may be called a resource element mapper. The IFFT unit 1113 performs IFFT on the input symbols and outputs a baseband signal for data, which is a signal in the time domain. The CP insertion unit 1114 copies part of the trailing part of the baseband signal for data and inserts the copied part before the baseband signal for data. Through the CP insertion, inter-symbol interference (ISI) and inter-carrier interference (ICI) are prevented, and orthogonality may be maintained even for multi-path channels.

On the other hand, the reception part 112 includes a wireless reception unit 1121, a CP removing unit 1122, an FFT unit 1123, and an equalizer unit 1124. The wireless reception unit 1121, the CP removing unit 1122, and the FFT unit 1123 of the reception part 112 performs inverse functions of the wireless transmission unit 1115, the CP insertion unit 1114, and the IFFT unit 1113. The reception part 112 may further include a demodulator.

The invention claimed is:

1. A method for performing communication on a sidelink of a wireless communication system, the method comprising:
    obtaining, by a first User Equipment (UE), synchronization for the sidelink;
    receiving, by the first UE, reception (RX) data through the sidelink from a second UE;
    obtaining, by the first UE, first information related to a Channel Busy Ratio (CBR) related to congestion on the sidelink and second information related to a Reference Signal Received Power (RSRP) of the sidelink;
    setting, by the first UE, a length of a feedback signal for the RX data based on the CBR and the RSRP, wherein the feedback signal is a Hybrid Automatic Repeat request (HARQ) Acknowledgement (ACK) signal and/or a HARQ Negative ACK (NACK) signal for the RX data, wherein the length is selected from a first length group or a second length group based on the CBR, and the first length group is selected for the CBR having a busy ratio greater than a pre-determined threshold; and
    transmitting, by the first UE, the feedback signal to the second UE on the sidelink.

2. The method of claim 1, wherein the second UE obtains synchronization from a same synchronization reference as the first UE.

3. The method of claim 1, wherein the length of the feedback signal is set in units of Orthogonal Frequency Division Multiplexing (OFDM) symbols.

4. The method of claim 1, wherein the first UE is configured to communicate with at least one of a wireless communication server, and/or an autonomous vehicle.

5. The method of claim 1, wherein the first length group has at least one first length value, wherein the second length group has at least one second length value greater than the at least one first length value, wherein the length is selected from the at least one first length value based on the RSRP.

6. The method of claim 1, wherein the length is set based on a number of slots.

7. The method of claim 1, wherein the RX data is received through a Physical Sidelink Shared CHannel (PSSCH).

8. A first User Equipment (UE) supporting a sidelink, the first UE comprising:
    a transceiver configured for transmitting and receiving a radio signal; and
    a processor operatively connected to the transceiver and controlling the transceiver, wherein the processor is configured to:
    obtain, via the transceiver, synchronization for the sidelink,
    receive, via the transceiver, reception (RX) data through the sidelink from a second UE,
    obtain, via the transceiver, first information related to a Channel Busy Ratio (CBR) related to congestion on the sidelink and second information related to a Reference Signal Received Power (RSRP) of the sidelink,
    set a length of a feedback signal for the RX data based on the CBR and the RSRP, wherein the feedback signal is a Hybrid Automatic Repeat request (HARQ) Acknowledgement (ACK) signal and/or a HARQ Negative ACK (NACK) signal for the RX data, wherein the length is selected from a first length group or a second length group based on the CBR, and the first length group is selected for the CBR having a busy ratio greater than a pre-determined threshold; and
    transmit, via the transceiver, the feedback signal to the second UE on the sidelink.

9. The first UE of claim 8, wherein the second UE obtains synchronization from a same synchronization reference as the first UE.

10. The first UE of claim 8, wherein the length of the feedback signal is set in units of Orthogonal Frequency Division Multiplexing (OFDM) symbols.

11. The first UE of claim 8, wherein the transceiver is further configured to communicate with at least one of a wireless communication server, and/or an autonomous vehicle.

12. The first UE of claim 8, wherein the first length group has at least one first length value, wherein the second length group has at least one second length value greater than the at least one first length value, wherein the length is selected from the at least one first length value based on the RSRP.

13. The first UE of claim 8, wherein the length is set based on a number of slots.

14. The first UE of claim 8, wherein the RX data is received through a Physical Sidelink Shared CHannel (PSSCH).

* * * * *